(12) United States Patent
Ido et al.

(10) Patent No.: US 7,817,551 B2
(45) Date of Patent: *Oct. 19, 2010

(54) DATA RECEPTION APPARATUS AND DATA DISTRIBUTION SYSTEM

(75) Inventors: Daiji Ido, Yokohama (JP); Carsten Burmeister, Wiesenstrasse (DE); Jose Luis Rey, Heidenreichstrasse (DE)

(73) Assignee: Panasonic Corporation, Osaka (JP)

( * ) Notice: Subject to any disclaimer, the term of this patent is extended or adjusted under 35 U.S.C. 154(b) by 1390 days.

This patent is subject to a terminal disclaimer.

(21) Appl. No.: 10/491,009

(22) PCT Filed: Apr. 1, 2003

(86) PCT No.: PCT/JP03/04158

§ 371 (c)(1),
(2), (4) Date: Mar. 29, 2004

(87) PCT Pub. No.: WO03/090282

PCT Pub. Date: Oct. 30, 2003

(65) Prior Publication Data

US 2004/0240382 A1 Dec. 2, 2004

(30) Foreign Application Priority Data

Apr. 19, 2002 (JP) ............................. 2002-118112

(51) Int. Cl.
*H04J 1/16* (2006.01)
(52) U.S. Cl. ................. 370/235; 370/230; 370/254; 370/465
(58) Field of Classification Search ............ 370/232, 370/235, 236, 252, 253, 328, 329, 345, 229, 370/396, 490, 493, 230, 254, 465
See application file for complete search history.

(56) References Cited

U.S. PATENT DOCUMENTS

| 5,224,089 | A | | 6/1993 | Matsumura et al. |
| 5,623,483 | A | * | 4/1997 | Agrawal et al. ............. 370/253 |
| 5,654,962 | A | * | 8/1997 | Rostoker et al. ............ 370/232 |
| 5,708,796 | A | * | 1/1998 | Ozden et al. ................ 711/167 |
| 5,790,543 | A | * | 8/1998 | Cloutier ...................... 370/252 |

(Continued)

FOREIGN PATENT DOCUMENTS

JP 9298734 11/1997

(Continued)

OTHER PUBLICATIONS

Chinese Office Action dated Nov. 24, 2006 with English translation.

(Continued)

*Primary Examiner*—Ricky Ngo
*Assistant Examiner*—Dewanda Samuel
(74) *Attorney, Agent, or Firm*—Dickinson Wright PLLC

(57) ABSTRACT

A data reception apparatus has a data reception section that receives data sent from a server through a communication link. A storage section stores the received data, and a playback section plays back the stored data. A requesting section requests the server to send data, corresponding to a certain period, at a rate equal to or more than a normal rate and lower than a rate set up by the communication link.

10 Claims, 5 Drawing Sheets

U.S. PATENT DOCUMENTS

| | | | | |
|---|---|---|---|---|
| 5,822,524 | A * | 10/1998 | Chen et al. | 709/203 |
| 5,822,537 | A * | 10/1998 | Katseff et al. | 709/231 |
| 5,864,678 | A * | 1/1999 | Riddle | 709/235 |
| 5,875,297 | A * | 2/1999 | Yugawa et al. | 709/202 |
| 5,892,754 | A * | 4/1999 | Kompella et al. | 370/236 |
| 5,987,493 | A * | 11/1999 | Rangan et al. | 718/105 |
| 6,014,694 | A | 1/2000 | Aharoni et al. | 709/219 |
| 6,047,000 | A | 4/2000 | Tsang et al. | 370/412 |
| 6,111,863 | A * | 8/2000 | Rostoker et al. | 370/329 |
| 6,233,226 | B1 * | 5/2001 | Gringeri et al. | 370/252 |
| 6,240,105 | B1 * | 5/2001 | Zetts | 370/503 |
| 6,292,844 | B1 * | 9/2001 | Smyers et al. | 710/5 |
| 6,374,078 | B1 * | 4/2002 | Williams et al. | 455/7 |
| 6,389,473 | B1 * | 5/2002 | Carmel et al. | 709/231 |
| 6,625,656 | B2 * | 9/2003 | Goldhor et al. | 709/231 |
| 6,637,031 | B1 * | 10/2003 | Chou | 725/87 |
| 6,643,496 | B1 * | 11/2003 | Shimoyama et al. | 455/69 |
| 6,757,273 | B1 * | 6/2004 | Hsu et al. | 370/349 |
| 6,792,468 | B1 * | 9/2004 | Bloch et al. | 709/231 |
| 6,795,864 | B2 * | 9/2004 | Connor | 709/232 |
| 6,795,894 | B1 * | 9/2004 | Neufeld et al. | 711/113 |
| 6,823,380 | B1 * | 11/2004 | Nace et al. | 709/224 |
| 7,644,186 | B2 * | 1/2010 | Hata et al. | 709/247 |

FOREIGN PATENT DOCUMENTS

| | | |
|---|---|---|
| JP | 11068845 | 3/1999 |
| JP | 2000172599 | 6/2000 |
| JP | 2000228669 | 8/2000 |
| JP | 200194625 | 4/2001 |

OTHER PUBLICATIONS

Japanese Office Action dated Mar. 15, 2005 with English translation.
PCT International Search Report dated May 20, 2003.

* cited by examiner

| STEP | RTSP MESSAGE |
|---|---|
| ST306 | PLAY rtsp://mediaserver.com/movie.test RTSP/1.0<br>CSeq:4<br>Session:dfhyrio90llk<br>Range:npt=0-15<br>Speed:3.0 |
| ST307 | PLAY rtsp://mediaserver.com/movie.test RTSP/1.0<br>CSeq:5<br>Session:dfhyrio90llk<br>Range:npt=15-<br>Speed:1.0 |
| ST308 | RTSP/1.0 200 OK<br>CSeq:4<br>Session:dfhyrio90llk |
| ST309 | RTSP/1.0 200 OK<br>CSeq:5<br>Session:dfhyrio90llk |

FIG.4

DATA RECEPTION APPARATUS AND DATA DISTRIBUTION SYSTEM

TECHNICAL FIELD

The present invention relates to a data reception apparatus and data distribution system that receives and plays back data distributed from a server.

BACKGROUND ART

Conventionally, there is a technology called "streaming" for distributing packet data like images and speech from a media server on the Internet and receiving and playing back the data at a mobile station apparatus. According to this streaming technology, through a radio network connected to the Internet and a base station apparatus connected to the radio network, data such as moving images distributed from a media server is received by a mobile station apparatus from the base station apparatus and the moving images, etc., are played back. The mobile station apparatus that has received packet data such as moving images plays back the data such as moving images received from the media server.

In such a streaming technology, a phenomenon called "jitter" occurs in which a delay in data reception increases or decreases according to the network condition. When a delay occurs in data reception due to jitter, the data reception rate becomes lower than the data play back rate. In this case, if the received data is continued to be played back, it comes to a point at which there is no more data to be played back and the play back is no longer possible, and therefore the mobile station apparatus is provided with a buffer, the received data is temporarily stored in this buffer, the data is read from the buffer and played back. In this way, even if some delay occurs in received data, the data stored in the buffer is used for playback and it is there by possible to prevent play back of data from being stopped due to the delay of the received data. Therefore, when playback of data is started for the first time, an operation called "initial buffering" is performed first whereby a predetermined amount of data is stored in the buffer before the data is played back.

However, in the case of the conventional radio apparatus, the rate at which data is stored in the buffer before data play back is started is the same as the rate at which the data is stored in the buffer after the data play back is started, and therefore there is a problem that it takes time to store data in the buffer and it takes an excessive time after requesting the server to send data until the data is played back. Furthermore, it is also possible to request the server so as to increase the data transmission rate, but when the transmission rate is requested to be increased, the buffer becomes empty when a delay occurs in the received data due to congestion, etc., of the network, running short of data to be played back, making it impossible to play back the data.

DISCLOSURE OF INVENTION

It is an object of the present invention to provide a data reception apparatus and data distribution system that shortens a time required to store data in storing section before starting data play back and shortens a time after requesting the server to send data until the data is played back.

This object can be attained by predetermining a normal data reception rate at which data can be played back without interruption, requesting the server to send data at a rate equal to or higher than this normal reception rate before the data play back is started and when a predetermined amount of data is stored in the buffer and requesting the server to send data at the normal reception rate again after the predetermined amount of data is stored in the buffer and the data play back is started.

BRIEF DESCRIPTION OF DRAWINGS

FIG. 4 illustrates RTSP messages used in the media distribution system according to the embodiment of the present invention.

BEST MODE FOR CARRYING OUT THE INVENTION

Embodiment

Figure 1:
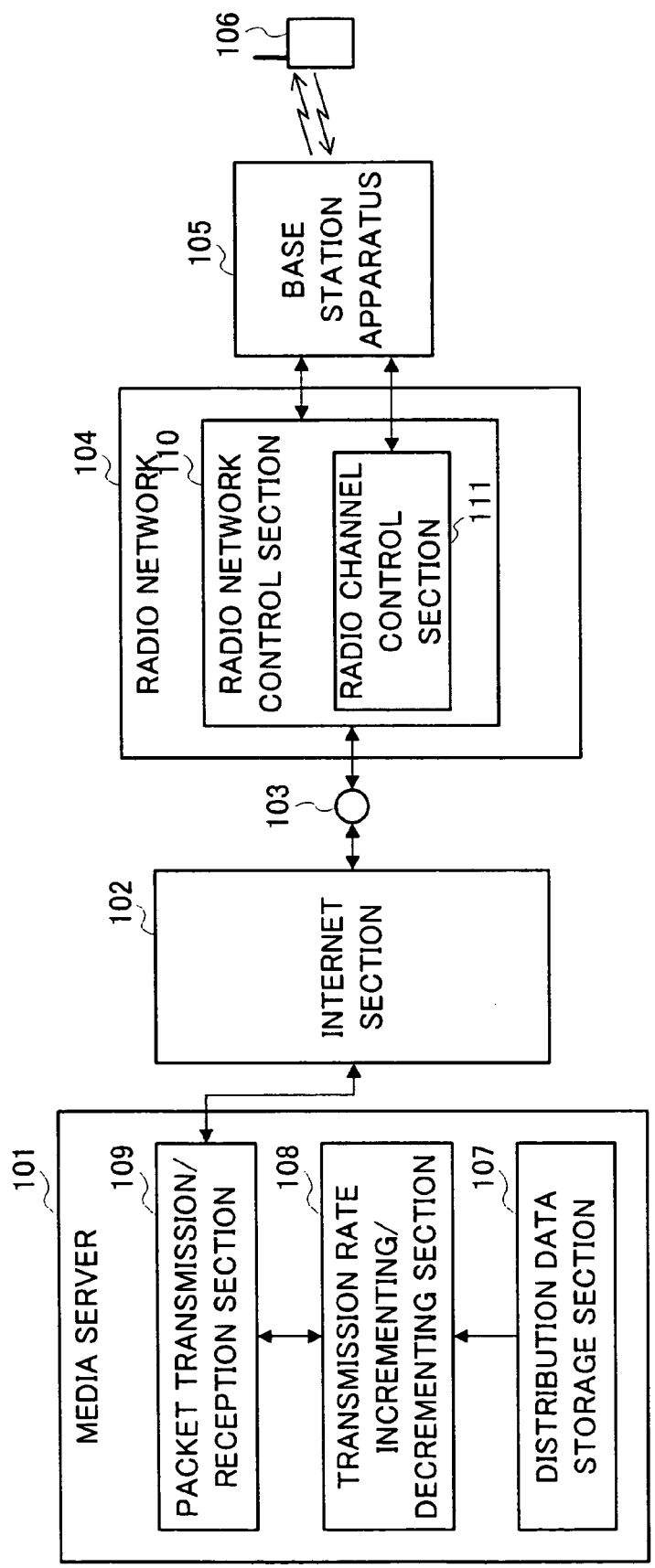
FIG. 1 illustrates an overview of a media distribution system according to an embodiment of the present invention.

With reference now to the attached drawings, an embodiment of the present invention will be explained in detail below. FIG. 1 illustrates an outline of a streaming technology. First, an overview of the streaming technology will be explained. A media server 101 which is the means for distributing data is principally constructed of a distribution data storage section 107, a transmission rate incrementing/decrementing section 108 and a packet transmission/reception section 109. The distribution data storage section 107 stores media to be distributed and outputs the media to the transmission rate incrementing/decrementing section 108 when a transmission request arrives from a mobile station apparatus. The transmission rate incrementing/decrementing section 108 controls the transmission rate for the data of the media to be distributed input from the distribution data storage section 107 in such a way that it becomes equal to the transmission rate requested from the mobile station apparatus 106 and outputs the controlled transmission rate to the packet transmission/reception section 109. The packet transmission/reception section 109 transmits/receives packets to/from the mobile station apparatus 106, receives control commands such as distribution request data from the mobile station apparatus 106 from the Internet 102, packetizes the distribution data whose transmission rate is controlled by the transmission rate incrementing/decrementing section 108 and sends the packet data to the mobile station apparatus 106 through the Internet 102.

The Internet 102 outputs the distribution data from the packet transmission/reception section 109 to the radio network 104 through a gateway 103 and outputs the control command from the radio network 104 received through the gateway 103 to the packet transmission/reception section 109. The radio network 104 includes a radio network control section 110 and the radio network control section 110 includes a radio channel control section 111.

The radio network control section 110 which is the notification means outputs the distribution data output from the Internet 102 to the base station apparatus 105. When the radio channel control section 111 receives a media distribution request from the mobile station apparatus 106 from the base station apparatus 105, it sets up a radio channel for the mobile station apparatus 106, adjusts a radio channel transmission rate according to the radio situation and outputs the result to the base station apparatus 105.

The base station apparatus 105 which is the transmission means receives the distribution data output from the radio network control section 110 and the result of adjustment of the radio channel transmission rate output from the radio channel control section 111, combines the distribution data and the result of adjustment of the radio channel transmission rate, converts it to a radio signal and then sends the radio signal to the mobile station apparatus 106. On the other hand, the base station apparatus 105 receives a control command for a distribution request from the mobile station apparatus 106 and outputs it to the radio network control section 110 and outputs the information that the distribution request has been received to the radio channel control section 111. The mobile station apparatus 106 receives the distribution data of the media sent by radio from the base station apparatus 105 and the result of adjustment of the radio channel transmission rate and sends the transmission request for the media distribution data to the base station apparatus 105 through a radio signal.

Figure 2:
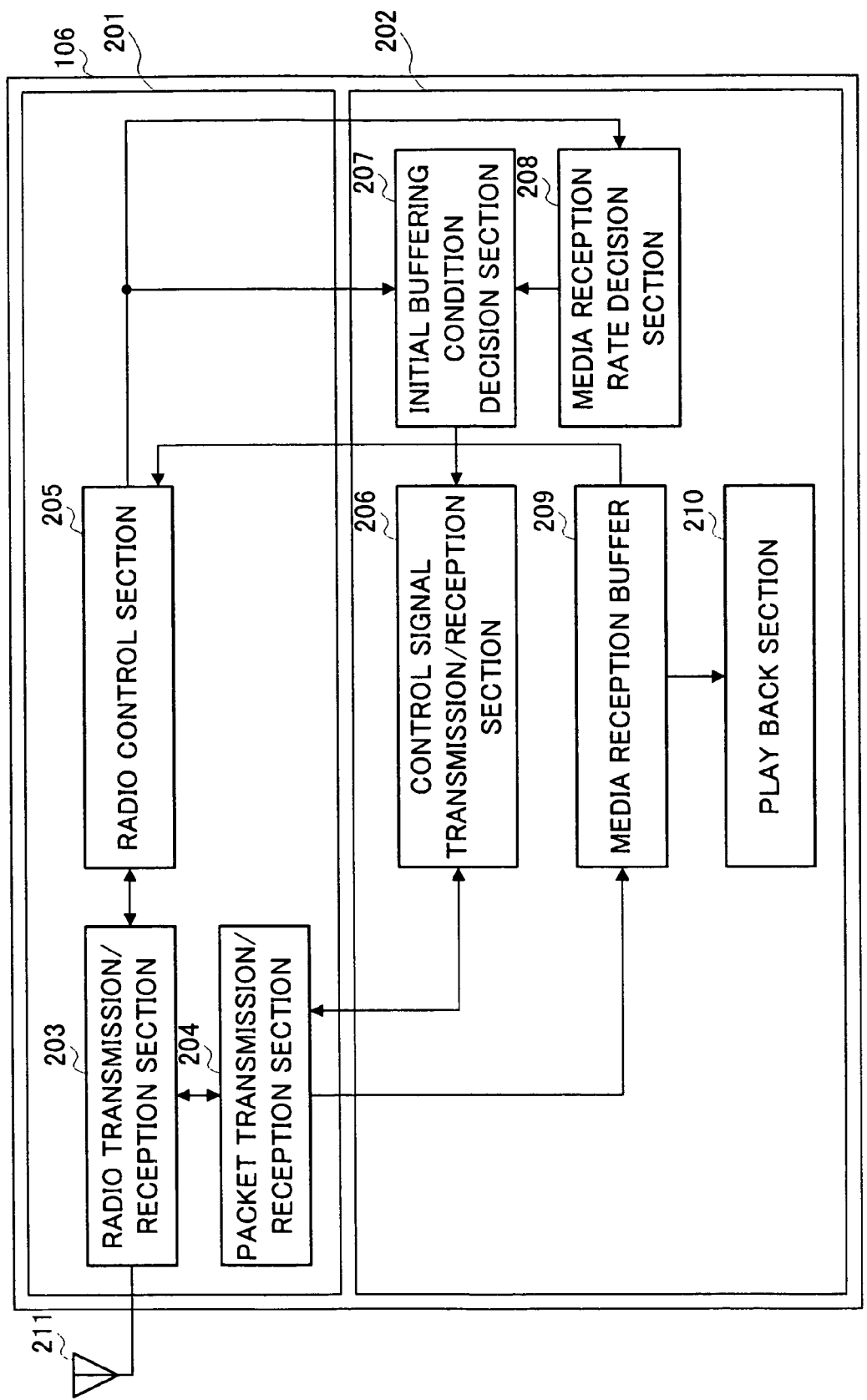
FIG. 2 is a block diagram showing a mobile station apparatus according to the embodiment of the present invention.

Then, the configuration of the mobile station apparatus 106 will be explained using FIG. 2. FIG. 2 shows the configuration of the mobile station apparatus 106. The mobile station apparatus 106 is constructed of a radio transmission section 201 and an application section 202.

The radio transmission section 201 is principally constructed of a radio transmission/reception section 203, a packet transmission/reception section 204 and a radio control section 205 and an antenna 211. The application section 202 is principally constructed of a control signal transmission/reception section 206, an initial buffering condition decision section 207, a media reception rate decision section 208, a media reception buffer 209 and a play back section 210.

First, the configuration of the radio transmission section 201 will be explained. The radio transmission/reception section 203 which is the data receiving means applies radio processing to packet data received through the antenna 211 and outputs the packet data to the packet transmission/reception section 204 and sends packet data input from the packet transmission/reception section 204 from the antenna 211 by radio. Furthermore, the radio transmission/reception section 203 sends a signal requesting a setup of a packet communication channel to be used for distribution of the media input from the radio control section 205 from the antenna 211 and outputs the transmission rate of the radio channel set up and sent from the radio network control section 110 to the radio control section 205.

The packet transmission/reception section 204 outputs an application control signal out of the received packet data input from the radio transmission/reception section 203 to the control signal transmission/reception section 206, and outputs the media data such as an image signal to the media reception buffer 209. Furthermore, the packet transmission/ reception section 204 receives a signal of an initial buffering time and initial buffering rate input from the control signal transmission/reception section 206 and outputs this signal of the initial buffering time and initial buffering rate as packet data to the radio transmission/reception section 203.

The radio control section 205, which is the monitoring means for monitoring a variation in the radio channel transmission rate, outputs the radio channel transmission rate which has been set up for the radio network control section 110 input from the radio transmission/reception section 203 to the initial buffering condition decision section 207 and the media reception rate decision section 208. Furthermore, when a signal indicating that the initial buffering has been completed is input from the media reception buffer 209, if the radio channel transmission rate was increased at the time of the initial buffering, the radio control section 205 outputs a signal for returning the transmission rate to the original rate before the initial buffering to the radio transmission/reception section 203. Here, the initial buffering refers to storing data in the media reception buffer 209 before reading of the media data from the media reception buffer 209 is started.

Then, the configuration of the application section 202 will be explained. The control signal transmission/reception section 206 controls the application section using a control signal of the application input from the packet transmission/reception section 204. Furthermore, the control signal transmission/reception section 206 outputs the initial buffering time and initial buffering rate decided by the initial buffering condition decision section 207 and input from the initial buffering condition decision section 207 to the packet transmission/reception section 204.

The initial buffering condition decision section 207 which is the requesting means decides the initial buffering time and initial buffering rate during the initial buffering time and outputs them to the control signal transmission/reception section 206.

The media reception rate decision section 208 which is the normal reception rate deciding means decides the rate at which media are received (hereinafter described as "media-specific rate") taking into account the radio channel transmission rate that can be set up input from the radio control section 205, play back capacity of the mobile station apparatus, buffer size and bandwidth and outputs the decided media-specific rate to the initial buffering condition decision section 207. The media-specific rate is a normal reception rate capable of playing back the media data read from the media reception buffer 209 by the play back section 210 without interruption and is the same rate as the rate at which media data is read from the media reception buffer 209 to the play back section 210. The rate at which media data before starting play back is received need not necessarily be the same as the rate at which media data is read from the media reception buffer 209 if it is at least greater than the rate at which media data is read from the media reception buffer 209.

The media reception buffer 209 which is the storing means receives and stores the media data of the packet data input from the packet transmission/reception section 204 at the time of initial buffering and starts to output the media data to the play back section 210 after the initial buffering is completed. The play back section 210 reads the media data from the media reception buffer 209 and plays back the media data.

Figure 3:
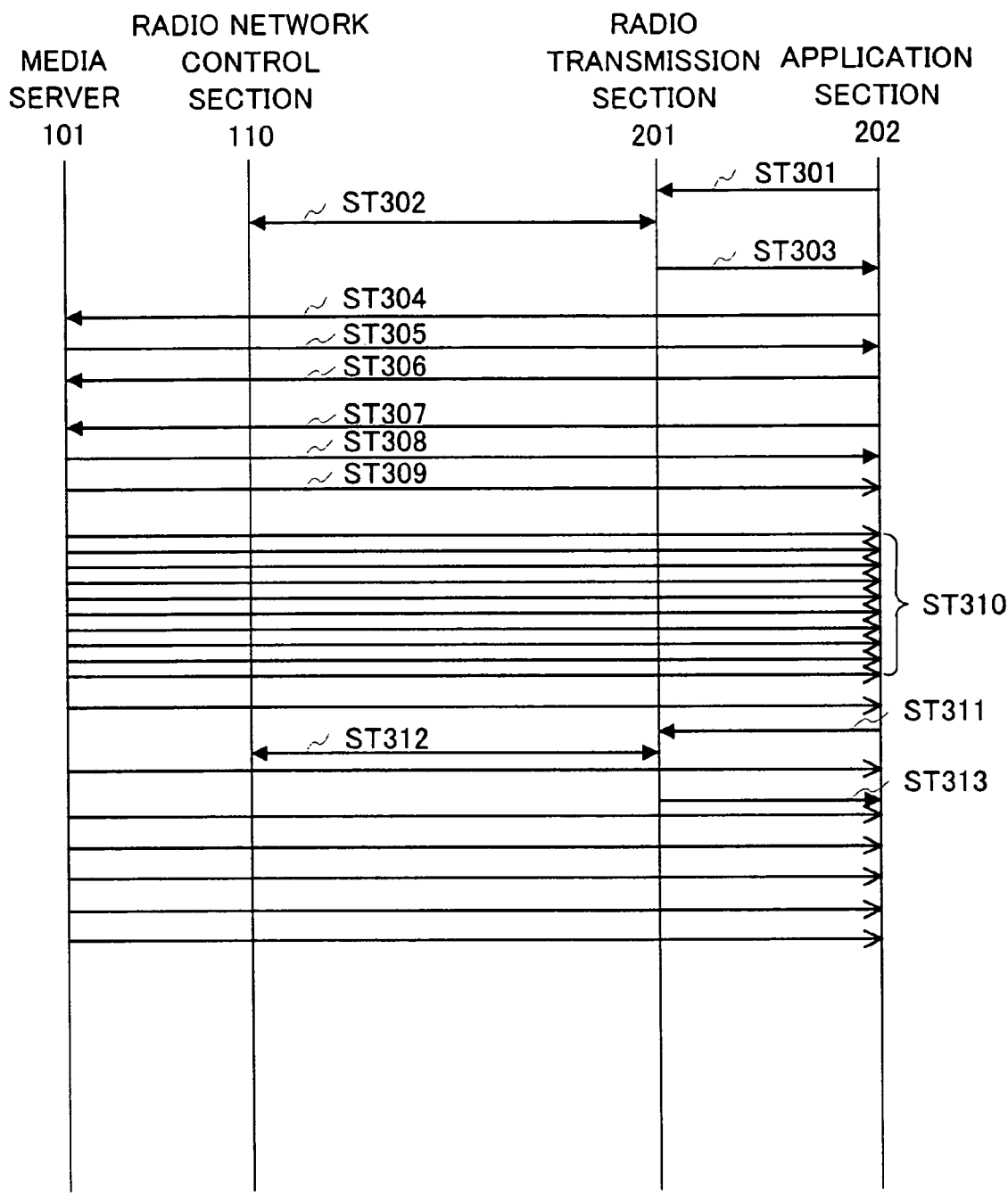
FIG. 3 illustrates operations of the media distribution system according to the embodiment of the present invention.

Then, the operations of the media server 101, radio network control section 110 and mobile station apparatus 106 in the above described configuration will be explained assuming a case where the maximum rate that can be set up is 384 kbps and the media-specific rate is 128 kbps as an example using FIG. 3 and FIG. 4. FIG. 3 illustrates an operation of the entire streaming technology and FIG. 4 illustrates RTSP messages used in various steps. The steps described in FIG. 4 correspond to the respective steps of FIG. 3. The media-specific rate is the same as the rate at which the media data is read from the media reception buffer 209, but need not necessarily be the same. In the explanation of operation, the base station apparatus 105 stands between the radio transmission section 201 and radio network control section 110 and the gateway 103 and Internet 102 stand between the radio network control section 110 and media server 101, but for convenience of explanation, their descriptions will be omitted. An application control section (not shown) in the mobile station apparatus sends a request signal to the radio control section 205 requesting it to set up a radio channel of 384 kbps which is the maximum rate that can be currently set up (step (hereinafter described as "ST") 301). The radio control section 205 sends the request signal for the setup of a radio channel of 384 kbps from the application section 202 to the radio network control section 110 through the radio transmission/reception section 203, negotiates with the radio network control section 110 and sets up a channel of 384 kbps which is the maximum rate of the radio channel transmission rate that can be set up (ST302). The radio control section 205 notifies the initial buffering condition setting section 207 and media reception rate decision section 208 that the desired 384 kbps channel could be set up (ST303).

Then, when notified that the 384 kbps was set up, the application section 202 requests the media server 101 through the radio transmission/reception section 203 to start a streaming session (ST304). Then, the media server 101 sends an OK signal indicating that the session was started to the application section 202 through the radio transmission section 201 (ST305).

When the session is started, the initial buffering condition decision section 207 sends a signal to the media server 101 through the control signal transmission/reception section 206, packet transmission/reception section 204 and radio transmission/reception section 203 requesting it to send media data (ST306, 307). ST306 is a data transmission request during initial buffering and ST307 is a data transmission request after initial buffering is completed. The transmission requests in ST306 and ST307 decide the reception rate of media data to be requested to the server from 384 kbps of the radio channel transmission rate input from the radio control section 205 and 128 kbps of the media-specific rate input from the media reception rate decision section 208 and requests the decided rate. In ST306, NPT=0-15 which is a control command to request transmission of media data for first 15 seconds is sent. In that case, by adding Speed 3.0, the transmission rate is specified to three times the media-specific rate.

Then, in ST307, NPT=15—which is a control command requesting that the portion of the media data from 15th second to the end should be sent is sent. In that case, by adding Speed 1.0, the transmission rate is specified to the same rate as the media-specific rate. When each transmission request can be responded, an OK signal indicating that each request can be responded is sent to the mobile station apparatus 106 (ST308, 309). The media server 101 sends the initial buffering data to the mobile station apparatus 106 at a transmission rate triple the media-specific rate for a predetermined time (ST310).

Here, the reason that the transmission rate during the initial buffering time is set to three times the media-specific rate and the amount of initial buffering data is specified to 15 seconds will be explained. Since the media-specific rate to be requested to the server is 128 kbps, for the initial buffering time (here, it is assumed to be media corresponding to 15 seconds from the start), the media server 101 is requested to send at a rate 384/128=3 times, that is, 384 kbps and send the media corresponding to from the 15th second on at 128 kbps, which is the media-specific rate. The amount of the initial buffering data is a value obtained by dividing the initial buffering memory size of the mobile station apparatus by the media transmission rate, and therefore it is 1920 kb/128 kbs=15 seconds. Then, when the initial buffering time of 5 seconds is completed, the media data corresponding to 15 seconds from the start has been stored and a predetermined amount of the media data has been stored in the media reception buffer 209. This causes the play back section 210 to start to read the media data from the media reception buffer 209 and then start play back. Furthermore, when the amount of data to be stored reaches the predetermined amount, the media reception buffer 209 sends a signal indicating it to the radio control section 205.

When notified from the media reception buffer 209 that the amount of data stored has reached the predetermined amount (ST311), the radio control section 205 sends a request signal to the radio control section 205 through the radio transmission/reception section 203 requesting it to change the transmission rate of the radio channel being set up from 384 kbps to 128 kbps which is the media-specific rate. The radio control section 205 performs re-negotiation (radio access bearer renegotiation) with the radio network control section 110 (ST312). When the change of the transmission rate to 128 kbps is completed, the radio control section 205 sends a signal indicating it to the application section 202 (ST313).

Figure 5:
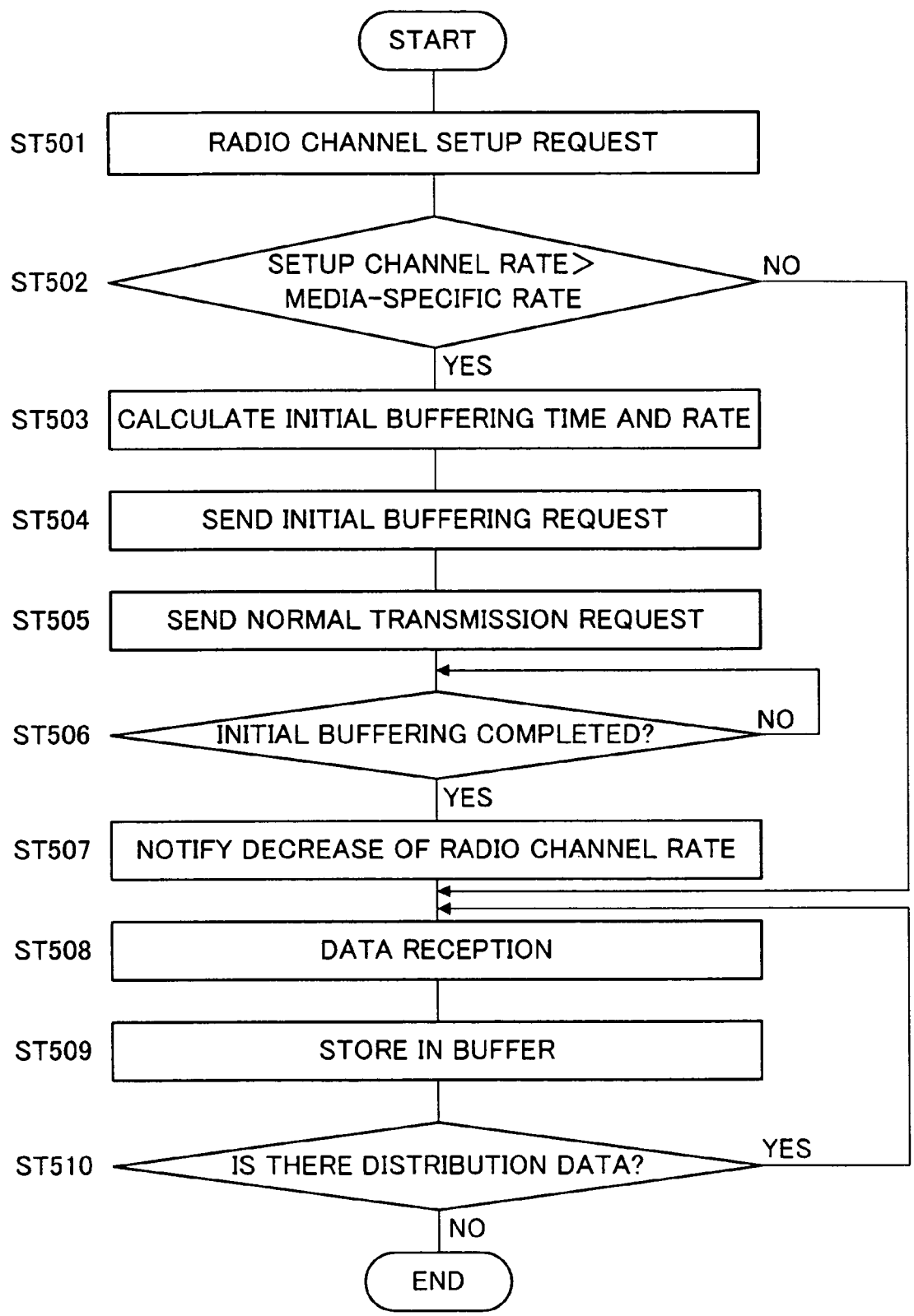
FIG. 5 is a flow chart showing operations of the mobile station apparatus according to the embodiment of the present invention.

Then, the operation of the mobile station apparatus 106 in the above described configuration will be explained using FIG. 5. FIG. 5 is a flow chart showing operations of the mobile station apparatus 106. The application section 202 requests the radio control section 205 to set up a radio channel of 384 kbps which is the maximum rate that can be currently set up and the radio control section 205 sends the request from the application section 202 for a setup of the radio channel to the radio channel control section 111 through the radio transmission/reception section 203 (ST501). Then, the radio control section 205 receives the signal indicating that the radio channel has been set up from the radio channel control section 111 through the transmission/reception section 203, the radio control section 205 then outputs the signal to the initial buffering condition decision section 207 and the initial buffering condition decision section 207 compares the levels of the set up radio channel rate 384 kbps and the media-specific rate 128 kbps. When the radio channel rate is substantially equivalent to the media-specific rate (approximately 128 kbps to 160 kbps), the radio channel rate of 128 kbps is set and when the radio channel rate is considerably large, the initial buffering time and initial buffering rate are calculated. On the other hand, when the radio channel transmission rate is smaller than the media-specific rate, the media data is received at the maximum rate of the radio channel that can be set up (ST502).

The initial buffering condition decision section 207 calculates the initial buffering time and initial buffering rate from the radio channel rate, media-specific rate and initial buffering memory size (ST503). Then, the calculated initial buffering condition is output from the initial buffering condition decision section 207 to the control signal transmission/reception section 206 and the control signal transmission/reception section 206 sends a request signal to the media server 101 through the packet transmission/reception section 204 and radio transmission/reception section 203 requesting it to perform initial buffering under the decided initial buffering condition (ST504) and after the initial buffering is completed, outputs a signal for requesting a return of the radio channel rate to 128 kbps to the control signal transmission/reception section 206 and the control signal transmission/reception section 206 sends the request to the media server 101 through the packet transmission/reception section 204 and radio transmission/reception section 203 (ST505).

Then, the media data is repeatedly stored in the media reception buffer 209 until the initial buffering is completed (ST506) and when the initial buffering is completed, a signal indicating that the initial buffering is completed is output from the media reception buffer 209 to the radio control section 205. When the radio control section 205 receives the signal indicating that the initial buffering is completed from the media reception buffer 209, it sends a request signal to the media server 101 through the radio transmission/reception section 203 requesting the media server 101 to return the radio channel transmission rate to 128 kbps (ST507). After the radio channel transmission rate is returned to 128 kbps, the media data is received continuously (ST508) and the received media data is stored in the media reception buffer 209 (ST509). Then, it is decided whether media data has been distributed from the server 101 or not and if the media data has been distributed, reception of the media data and storage of the media data in the media reception buffer 209 are repeated, and if no media data has been distributed, reception of media data is finished (ST510). These operations are performed when no media data is stored in the media reception buffer 209, when only a small amount of media data is stored in the media reception buffer 209 or when new media data is received.

The above described embodiment assumes that the media-specific transmission rate is 128 kbps and the maximum rate of the radio channel transmission rate that can be setup is 384 kbps, but these rates can be arbitrarily changed according to the type of media and communication environment, etc., and if initial buffering is performed at a rate equal to or greater than the media-specific rate, the same effect as that of the above described embodiment can be obtained. Furthermore, media data is assumed to be sent from the media server 101 to the mobile station apparatus 106 through the Internet 102, but media data need not necessarily be sent through the Internet 102. Furthermore, the above described embodiment assumes the mobile station apparatus 106 as the apparatus which receives the media data, but it may also be a fixed terminal other than the mobile station apparatus 106. Furthermore, instead of the mobile station apparatus 106, a fixed communication terminal apparatus can also be used. Furthermore, the above described embodiment assumes that initial buffering is performed for 5 seconds at 384 kbps and initial buffering is performed for 15 seconds at 128 kbps, but it is also possible to decide the end of initial buffering with the amount of data subjected to initial buffering instead of deciding the time for ending the initial buffering. Furthermore, the above described embodiment has explained the case where media data is stored in the media reception buffer 209 starting from a state in which it is empty, but the present invention is also applicable even if a small amount of data remains in the media reception buffer 209.

As explained above, before data playback is started, the present invention can shorten the time required to store data in the storing section and shorten the time after requesting the server to send data until the data is played back.

This application is based on the Japanese Patent Application No. 2002-118112 filed on Apr. 19, 2002, entire content of which is expressly incorporated by reference herein.

INDUSTRIAL APPLICABILITY

The present invention is preferably applicable to a data reception apparatus and data distribution system that receives and plays back data distributed from a server.

What is claimed is:

1. A data reception apparatus comprising:
    a data reception section that receives data sent from a server through a communication link;
    a storage section that stores the received data;
    a playback section that plays back the stored data; and
    a requesting section that requests, in a first request, the server to send initial buffering data at a rate more than a media specific rate for a specified period and requests, in a second request, the server to send other data at the media specific rate for a period after the specified period, wherein
    the first request comprises information that identifies the specified period.

2. The apparatus according to claim 1, wherein the first request requests the server to send the initial buffering data at a rate determined by dividing a rate set up for the communication link by the media specific rate.

3. The apparatus according to claim 1, wherein the first request requests the server to send the initial buffering data at a rate lower than a rate set up for the communication link.

4. A data distribution system comprising a data reception apparatus and a data distribution server distributing data to the data reception apparatus, wherein:
    the data reception apparatus comprises:
    a data reception section that receives data sent from a server through a communication link;
    a storage section that stores the received data;
    a playback section that plays back the stored data; and
    a requesting section that requests, in a first request, the server to send initial buffering data at a rate more than a media specific rate for a specified period and requests, in a second request, the server to send other data at the media specific rate for a period after the specified period, wherein
    the first request comprises information that identifies the specified period.

5. A data reception method comprising:
    receiving data sent from a server through a communication link;
    storing the received data in a storage section;
    playing back the stored data; and
    requesting, in a first request, the server to send initial buffering data at a rate more than a media specific rate for a specified period and requesting, in a second request, the server to send other data at the media specific rate for a period after the specified period, wherein
    the first request comprises information that identifies the specified period.

6. The apparatus according to claim 1, wherein the media specific rate is a rate the play back section reads the data from the storage section.

7. The apparatus according to claim 1, wherein the first request is made for initial buffering, in which a predetermined amount of data is stored in the storage section before the data is played back in the playback section.

8. The apparatus according to claim 1, further comprising:
    a monitoring section that monitors a variation of a channel transmission rate, wherein:
    the requesting section makes the first request when the channel transmission rate monitored in the monitoring section becomes equal to or greater than the media specific rate.

9. The apparatus according to claim 1, wherein the requesting section requests, in the second request, the server to send the data at the media specific rate when initial buffering is finished.

10. The apparatus according to claim 7, wherein the requesting section requests, in the second request, the server to send the data at the media specific rate when the predetermined amount of data is stored in the storage section before the data is played back in the playback section.

* * * * *